(12) United States Patent
Blattert et al.

(10) Patent No.: US 10,800,385 B2
(45) Date of Patent: Oct. 13, 2020

(54) METHOD FOR OPERATING A BRAKE SYSTEM WITH AN AUTOMATED PARKING BRAKE

(71) Applicant: Robert Bosch GmbH, Stuttgart (DE)

(72) Inventors: Dieter Blattert, Kirchheim/Neckar (DE); Frank Baehrle-Miller, Shoenaich (DE)

(73) Assignee: Robert Bosch GmbH, Stuttgart (DE)

( * ) Notice: Subject to any disclaimer, the term of this patent is extended or adjusted under 35 U.S.C. 154(b) by 128 days.

(21) Appl. No.: 16/103,501

(22) Filed: Aug. 14, 2018

(65) Prior Publication Data

US 2019/0054903 A1    Feb. 21, 2019

(30) Foreign Application Priority Data

Aug. 18, 2017    (DE) .................. 10 2017 214 455

(51) Int. Cl.
| | |
|---|---|
| *B60T 7/12* | (2006.01) |
| *B60T 13/74* | (2006.01) |
| *B60T 17/22* | (2006.01) |
| *B60T 13/66* | (2006.01) |
| *B60T 8/17* | (2006.01) |
| *B60T 8/32* | (2006.01) |
| *B60T 8/58* | (2006.01) |
| *B60T 17/18* | (2006.01) |
| *F16D 121/24* | (2012.01) |
| *F16D 125/40* | (2012.01) |
| *F16D 121/04* | (2012.01) |

(52) U.S. Cl.
CPC .............. *B60T 7/12* (2013.01); *B60T 8/1701* (2013.01); *B60T 8/321* (2013.01); *B60T 8/58* (2013.01); *B60T 13/662* (2013.01); *B60T 13/741* (2013.01); *B60T 17/18* (2013.01); *B60T 17/221* (2013.01); *B60T 8/32* (2013.01); *F16D 2121/04* (2013.01); *F16D 2121/24* (2013.01); *F16D 2125/40* (2013.01)

(58) Field of Classification Search
CPC ........................ C12Q 1/6883; C12Q 2600/156
USPC ........................................................... 701/70
See application file for complete search history.

(56) References Cited

U.S. PATENT DOCUMENTS

| | | | | |
|---|---|---|---|---|
| 2006/0267402 | A1* | 11/2006 | Leiter | .................... B60T 7/107 303/20 |
| 2008/0190718 | A1* | 8/2008 | Klusemann | ............. B60T 13/74 188/161 |
| 2008/0262687 | A1 | 10/2008 | Fujita et al. | |
| 2012/0205202 | A1* | 8/2012 | Baehrle-Miller | ..... B60T 13/588 188/106 P |

(Continued)

FOREIGN PATENT DOCUMENTS

| | | |
|---|---|---|
| DE | 10 2013 218 401 A1 | 3/2015 |
| DE | 10 2014 204 287 A1 | 9/2015 |

*Primary Examiner* — Muhammad Shafi
(74) *Attorney, Agent, or Firm* — Maginot, Moore & Beck LLP

(57) ABSTRACT

A method for operating a brake system with an automated parking brake for a motor vehicle, includes detecting a defined fault. The method further includes activating a parking mode of the parking brake automatically when the defined fault is detected. The automated parking brake is operable in different operating modes, a first operating mode corresponding to a drive mode and a second operating mode corresponding to the parking mode.

14 Claims, 4 Drawing Sheets

(56) References Cited

U.S. PATENT DOCUMENTS

2015/0251639 A1* 9/2015 Sautter .................... B60T 8/174
  701/70
2016/0214595 A1* 7/2016 Baehrle-Miller ......... B60T 7/22
2016/0339888 A1* 11/2016 Yokoyama .............. F16D 65/18

* cited by examiner

METHOD FOR OPERATING A BRAKE SYSTEM WITH AN AUTOMATED PARKING BRAKE

This application claims priority under 35 U.S.C. § 119 to patent application no. DE 102017214455.6 filed on Aug. 18, 2017 in Germany, the disclosure of which is incorporated herein by reference in its entirety.

The disclosure relates to a method for operating a brake system with an automated parking brake for a motor vehicle, wherein the automated parking brake can be operated in different operating modes, wherein a first operating mode corresponds to a drive mode, and a second operating mode corresponds to a parking mode, wherein the method is characterized in that in the parking mode the parking brake is activated automatically when a defined fault is detected. Furthermore, the disclosure relates to a corresponding apparatus which is configured to execute the method.

BACKGROUND

Patent application DE 10 2014 204 287 A1 is for example known from the prior art. This document relates to a method for operating a motor vehicle brake device which has at least one electronic parking brake with at least one actuator, wherein when a first switching signal is applied to a switching signal input the actuator is actuated to activate the parking brake. There is provision here that in a normal operating mode the switching signal input is released to apply any desired switching signals, and in a safety operating mode it is set to a second switching signal which is different from the first switching signal, with the result that the actuation of the actuator for activating the parking brake is prevented. Under certain conditions, the ASIC described in said document can be modified in respect of its provision of functions. In this context, this function is enabled during highly automated parking. This then makes it possible that in the event of failure of the ESP—in particular of the microcomputer—during the highly automated parking, this is detected by the ASIC and the latter automatically applies the parking brake. During the normal driving process, this special function of the ASIC is inactive, so that undesired application of the brake cannot occur during travel.

Furthermore, patent application DE 10 2013 218 401 A1 is known from the prior art. This document relates to a method for operating a motor vehicle, wherein at least one autonomous or partially autonomous operating mode of the motor vehicle can be activated and the motor vehicle has a service brake and a parking brake, wherein the method is characterized in that in reaction to a detected operating state of the motor vehicle the parking brake is adjusted from a state of rest into a predetermined operating state, wherein the predetermined operating state of the parking brake is determined in such a way that the parking brake does not generate a braking effect or generates a braking effect which is significantly lower compared to full activation.

SUMMARY

In contrast, the method according to the disclosure advantageously permits the availability of the parking function and the safety of the system to be increased without a component which is involved experiencing an increased load.

This is made possible by means of the features specified in the disclosure. Further refinements of the subject matter are disclosed.

The method according to the disclosure for operating a brake system with an automated parking brake for a motor vehicle, wherein the automated parking brake can be operated in different operating modes, wherein a first operating mode corresponds to a drive mode, and a second operating mode corresponds to a parking mode, is characterized in that in the parking mode the parking brake is activated automatically when a defined fault is detected.

This is to be understood as meaning that in the event of a fault of the brake system the automated parking brake is activated in an automated fashion and independently of a driver input. However, such activation in the event of a fault is executed only and exclusively when the parking brake is operated in the parking mode. This requires a plurality of operating strategies to be defined and capable of being set for the parking brake.

In a parking mode, the parking brake is, for example, enabled to receive and implement control commands. In a drive mode, the parking brake is, for example, decoupled in such a way that control commands cannot arrive at the parking brake. Therefore, in the drive mode the parking brake can neither execute an activation process requested by the driver nor execute an activation process requested, for example, by a driver assistance system. However, this is possible in the parking mode. An activation process is to be understood here as referring, in particular, to application of the parking brake. Application of the parking brake in drive mode is therefore not possible. Alternatively, activation can also be understood as meaning opening of the parking brake. A fault in the brake system can be understood as meaning any type of fault in a component of the brake system, for example in the brake apparatus itself, in the sensor system, control system, actuator system, pressure generation means etc. A fault can be both material failure as well as, for example, signals which are absent or faulty.

This can advantageously increase safety. Automatic application of the parking brake in the event of a fault permits safe shutting down of the vehicle. Furthermore, this method avoids the need to search, in the event of a fault, for a suitable possible way of shutting down which permits shutting down even without a parking brake. This can increase the availability of the automated parking brake. The described method also advantageously does not apply any additional load to the parking brake, since the latter continues to be locked only when needed, or else in the event of a fault in the corresponding situation.

In one advantageous embodiment, the method is characterized in that the parking mode is activated if a parking situation is detected.

This is understood as meaning that the activation of the "parking mode" operating mode is executed only if it is detected that the vehicle is in a parking process or such a parking process is imminent. If a parking situation is detected, the parking mode can, for example, be set in an automated fashion. The parking situation can be detected by means of a driver assistance system such as, for example, a HAP (Highly Automated Parking) function. This can advantageously improve the user-friendliness if the driver does not have to select the operating modes manually but rather these are selected in an automated fashion. Furthermore, this can increase the safety, since the possibility of the user forgetting to activate the parking mode himself is avoided.

In one possible refinement, the method is characterized in that a parking situation is detected if a defined speed criterion is satisfied, in particular if the speed of the motor vehicle is lower than a defined speed threshold.

This is understood as meaning that the activation of the "parking mode" operating mode is executed when it is inferred that a parking process is imminent on the basis of the driving behavior. For example, when the vehicle is traveling at a low speed. For example 10 km/h can be defined as the speed threshold. However, other low speeds such as, for example, 5 km/h or 15 km/h are also conceivable. In one alternative embodiment, the deceleration of the vehicle can also be taken into account. Of course, a combination of deceleration of the vehicle from a first speed and further driving of the vehicle at a second low speed can also be considered to be an indication of an imminent parking process. Since the activation of the parking mode in this refinement is dependent on the speed of the vehicle, automated application of the brake in a fault situation can also take place only when the vehicle is moving at less than the defined speed. This can advantageously increase safety. For example, safety can be increased by virtue of the fact that the parking brake is not activated automatically at an excessively high speed. This can avoid locking of the wheels in a critical speed range.

In one preferred embodiment, the method is characterized in that a parking situation is detected on the basis of the position of the motor vehicle, in particular when GPS data of the motor vehicle and map data are compared, for example for a car park and/or
for a piece of private land and/or
for a multistory car park and/or
an underground car park.

This is understood as meaning that on the basis of the current location of the vehicle it is estimated whether it is carrying out a parking process or whether such a parking process is imminent. The current location can be determined by means of GPS data. In order to estimate the probability of a parking process, the position of the vehicle can be compared with possible parking areas. Data in which, for example, possible parking areas are denoted can be used for this. This data may be general map data or else individual parking positions which the vehicle has assumed during earlier journeys or which have been defined as such by the driver or as a parking position by third parties. These include, in particular, pieces of private land, multistory car parks, underground garages, etc. Data from video sensors (for example camera images) can also be taken into account for the determination of the precise position and situation. The current position of the vehicle—and if appropriate the comparison of the positioning with stored parking positions—can advantageously permit easy estimation as to whether the driver plans to park the vehicle. This permits the necessary computational capacity to be limited. Furthermore, an improvement in the quality of the results can be expected.

In one alternative development, the method is characterized in that the parking mode is activated if an automated parking process is detected.

This is understood as meaning that the activation of the parking mode is executed only when an automated parking process is imminent. The activation of an automated parking process can be carried out, for example, by means of the driver by means of activation of an input device in the vehicle. Alternatively, an activation process can also be started by means of externally transmitted signals, for example by means of a vehicle key or a cell phone. In particular, in the case of highly automated parking processes there is no need for the driver to be located in the vehicle in order to be able to intervene in the automated parking process if appropriate. This advantageously permits easy detection of the automated parking process. It is therefore possible to carry out very focused activation of the parking mode in accordance with demand. Furthermore, safety can be increased by the activation of the parking mode, since in this context the parking brake would be automatically activated in the event of a fault. This increase in safety reduces further the need for the driver to monitor the automated parking process while it is being carried out and/or to be located in the vehicle during said parking process.

In one advantageous refinement, the method is characterized in that the parking mode is deactivated if a defined speed criterion is no longer satisfied, in particular if the speed of the motor vehicle is higher than a defined speed threshold.

This is to be understood as meaning that the "parking mode" is maintained only for as long as the vehicle is moved less than the defined speed. When the speed threshold is exceeded, the "drive mode" operating mode of the parking brake is in turn activated. This changeover between the two operating modes can be possibly performed in automated fashion. This can in turn advantageously improve the user-friendliness. Furthermore, the safety is of course also optimized in that automated application of the parking brake in the event of a fault—as is provided in the parking mode—is avoided at excessively high speeds. This also avoids locking of the wheels by means of the parking brake and ensures a high level of driving stability of the vehicle.

In one possible embodiment, the method is characterized in that in the drive mode the parking brake is not activated automatically when a defined fault is detected.

This is understood as meaning that the automatic parking brake is not activated even when a fault is detected if the vehicle or the parking brake is not in the "parking mode" operating mode. In particular if the "drive mode" operating mode is activated, the parking brake is not applied automatically as soon as a defined fault is detected. This can advantageously optimize operational and driving safety. A negative effect on the driving stability is also avoided by this means.

In one preferred development, the method is characterized in that the parking brake is operated in different operating modes by means of an electronic circuit.

This is understood as meaning that switching between two operating modes can be carried out by means of an electronic circuit. This circuit also permits the respective operating mode to be maintained and/or executed. In particular application-specific integrated circuits, referred to as ASICs, are provided as the circuit. Such a circuit is described, for example, in document DE 10 2014 204 287 A1. Of course, there is provision for the circuit described there to be correspondingly adapted and for means to be provided, in order to execute the method described above with said means. As a result of such a circuit in the control unit itself, the method advantageously does not result in any increase in load, since only the ASIC is switched over functionally. This occurs in a load-neutral fashion. Furthermore, this permits cost-effective implementation of the method. Functional integration can also be made possible by virtue of the use of such a circuit, permitting a simple design of the system.

In one alternative embodiment, the method is characterized in that an electronic circuit is switched off in such a way that in the parking mode a switching signal input for actuating the parking brake is released, and/or in that in the drive mode actuation of the parking brake is prevented.

This is understood as meaning that in the drive mode the electronic circuit interrupts the switching signal flow. That is to say that in the drive mode actuation of the parking brake is not possible even if a corresponding actuation signal has been generated. The actuation signal is not passed on to the actuator of the parking brake owing to the electronic circuit. Activation of the parking brake is therefore not possible manually with activation by the driver or in an automated fashion by means of a monitoring and/or control unit, for example when a fault is detected. As a result safety with respect to the driving stability can be advantageously improved. Locking of the wheels during travel owing to an applied parking brake can therefore be effectively avoided.

In one advantageous refinement, the method is characterized in that the method is executed only when there is an intact brake system.

This is understood as meaning that such a method is executed only if no faults are present or have been detected. Therefore, before the operating mode is changed it is checked whether the brake system is intact. This means that a change in the operating modes is possible only when there is an intact brake system. Alternatively or additionally, a selection (if appropriate automated) of the "parking mode" operating mode is possible only when there is an intact brake system. An intact brake system is to be understood as meaning that both the components themselves appear to be in order and all the relevant data signals are available and are supplying valid information. Such a limitation of the execution of the method can advantageously increase the safety during operation.

According to the disclosure, an electronic circuit device for operating an automated parking brake in different operating modes is furthermore provided, wherein a first operating mode corresponds to a drive mode and a second operating mode corresponds to a parking mode, wherein in the parking mode the circuit device permits the actuation of the parking brake to be released, and in the drive mode it permits the actuation of the parking brake to be prevented, wherein this is characterized in that in the parking mode the circuit device brings about automated application of the parking brake when a defined fault is detected.

This is understood as meaning an electronic circuit device which is configured to execute the method according to the description above in the case of correct use. That is to say it is advantageous to provide a circuit device, wherein when a first switching signal is applied to a switching signal input of the actuator of the parking brake is actuated to activate the parking brake and that in the parking mode the switching signal input is released to apply any desired switching signals, and in the drive mode it is set to a second switching signal which is different from the first switching signal, with the result that the actuation of the actuator to activate the parking brake is prevented. Furthermore, there can advantageously be provision that the parking brake actuator can be actuated by means of at least one switch of the switching device, wherein the switch has the switching signal input, and when the first switching signal is applied to the switching signal input it assumes a first switched state which is directed toward the activation of the parking brake. The advantages of such a device correspond essentially to the advantages which the method as described above offers. Therefore reference is made to the statements above.

Furthermore, according to the disclosure an apparatus is provided which is configured, in the case of correct use, to execute the method according to the above description. This is understood as meaning that the apparatus is designed, that is to say configured and/or has means, for carrying out a method as described above in the case of correct use. An apparatus can be considered to be, for example, a control unit and/or a memory element and/or an operator control element. That is to say, for example, ESP control unit or APB control unit which carries out control of a parking brake in order to activate the parking brake automatically in a parking mode when a defined fault is detected. Apparatus is also to be understood as the automated parking brake apparatus. By means of such apparatuses it is possible to implement the advantages which have already been described within the scope of the method.

According to the disclosure, a computer program is also provided which is configured to execute the described method as well as a machine-readable storage medium on which the computer program is stored. This is understood as meaning that the computer program has a program code for carrying out one or more or all of the method steps mentioned above when the computer program is running on a computer.

BRIEF DESCRIPTION OF THE DRAWINGS

It is to be noted that the features which are specified individually in the description can be combined with one another in any desired technically appropriate manner and indicate further refinements of the disclosure. Further features and expediences of the disclosure can be found in the description of exemplary embodiments with reference to the appended figures, of which.

DETAILED DESCRIPTION

Figure 1:
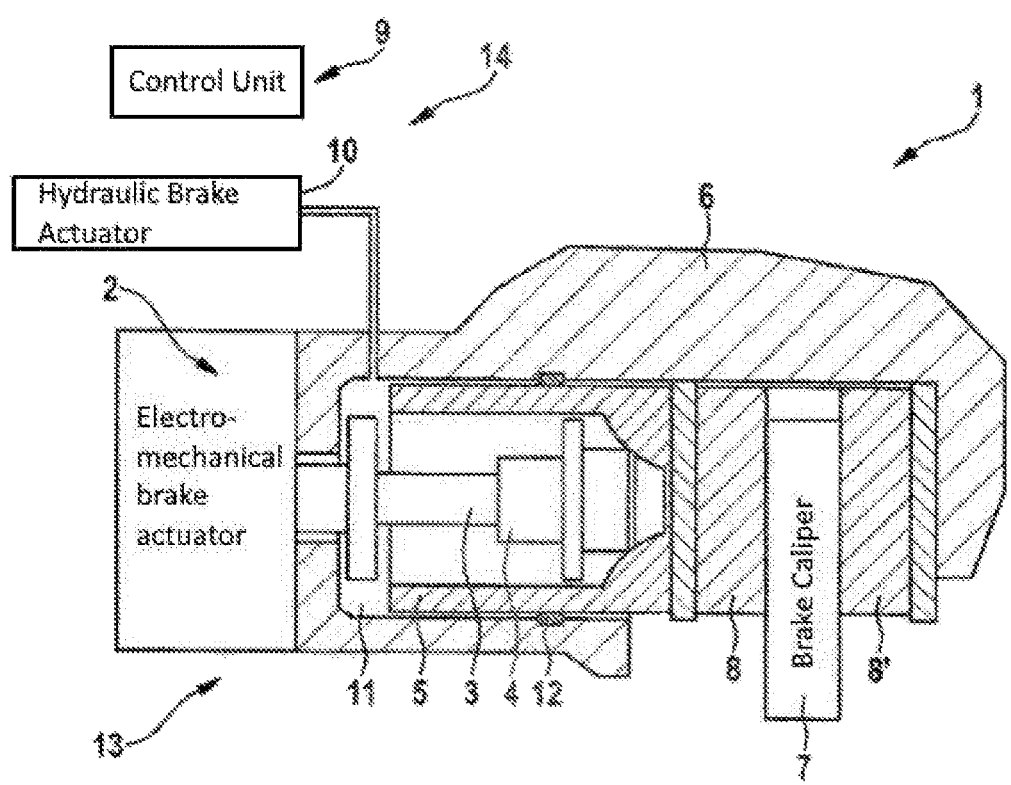
FIG. 1 shows a schematic side view of a brake apparatus with an automatic parking brake of the "motor on caliper" design.

FIG. 1 shows a schematic sectional view through a brake apparatus 1 for a vehicle. The brake apparatus 1 has here an automated parking brake 13 (also referred to as automatic parking brake or automated parking brake, APB for short) which can exert a clamping force for securing the vehicle by means of an electromechanical actuator 2 (electric motor). A brake system frequently comprises two parking brakes 13, each with an electromagnetic actuator 2. The parking brakes are frequently arranged on the rear axle, wherein in each case one parking brake 13 is positioned on the left-hand and right-hand brake apparatuses 1. Of course, it is also possible to arrange the parking brakes alternatively or additionally on the front axle.

The electromagnetic actuator 2 of the illustrated parking brake 13 drives for a spindle 3, in particular a threaded spindle 3, which is mounted in an axial direction. At its end facing away from the actuator 2, the spindle 3 is provided with a spindle nut 4 which, in the clamped state of the automated parking brake 13, bears against the brake piston 5. The parking brake 13 transmits in this way a force to the brake linings 8, 8' or the brake disk 7. The spindle nut bears here on an inner end side of the brake piston 5 (also referred to as the rear side of the brake piston or inner piston base). When a rotational movement of the actuator 2 and a resulting rotational movement of the spindle 3 occur, the spindle nut 4 is shifted in the axial direction. The spindle nut 4 and the brake piston 5 are mounted in a brake caliper 6 which engages over a brake disk 7 in a pincer-like fashion.

A braking lining 8, 8' is arranged on each of the two sides of the brake disk 7. In the case of an application process of the brake apparatus 1 by means of the automated parking brake 13, the electric motor (actuator 2) rotates, after which the spindle nut 4 and the brake piston 5 are moved in the axial direction toward the brake disk 7, in order thereby to generate a predetermined clamping force between the brake linings 8, 8' and the brake disk 7. Owing to the spindle drive and the self-locking which is associated therewith a forces generated at the parking brake 13 by means of actuation of the electric motor is maintained even when the actuation ends.

The automated parking brake 13 is, for example, embodied, as depicted, as a motor-on-caliper system and is combined with the service brake 14. The parking brake 13 could also be considered to be integrated into the system of the service brake 14. Both the automated parking brake 13 and the service brake 14 engage on the same brake piston 5 as well as the same brake caliper 6 here, in order to build up a braking force on the brake caliper 7. However, the service brake 14 has a separate hydraulic actuator 10 or a foot brake pedal with a brake booster. The service brake 14 is configured as a hydraulic system in FIG. 1, wherein the hydraulic actuator 10 can be assisted by the ESP pump or an electromechanical brake booster (for example Bosch iBooster) or can be implemented thereby. Further embodiments of the actuator 10 are also conceivable, for example in the form of what is referred to as an IPB (Integrated Power Brake) which basically constitutes a brake-by-wire system in which a plunger is used to build up hydraulic pressure. In the case of a service braking operation, a predetermined clamping force is built up hydraulically between the brake linings 8, 8' and the brake disk 7. In order to build up a braking force by means of the hydraulic service brake 14 a medium 11, in particular an essentially incompressible brake fluid 11, is forced into a fluid space which is bounded by the brake piston 5 and the brake caliper 6. The brake piston 5 is sealed off from the surroundings by means of a piston sealing ring 12.

The brake actuators 2 and 10 are actuated by means of one or more output stages, i.e. by means of a control unit 9 which can be, for example, a control unit of a vehicle movement dynamic system such as ESP (electronic stability program) or some other control unit.

When the automatic parking brake 13 is actuated, firstly the idle travel or the clearance must be overcome before a braking force can be built up. Idle travel denotes, for example, the distance which the spindle nut 4 has to overcome as a result of the rotation of the spindle 3 in order to make contact with the brake piston 5. Clearance denotes the distance between the brake linings 8, 8' and the brake disk 7 in disk brake systems of motor vehicles. This process generally takes a relatively long time with respect to the overall actuation process, in order in the case of the automated parking brake 13. At the end of a such preparation phase, the brake linings 8, 8' are placed against the brake disk 7 and the buildup of force starts in a further method. FIG. 1 shows the state of the idle travel and clearance which have already been overcome. In this context, the brake linings 8, 8' are placed against the brake disk 7 and all the brakes, i.e. the parking brake 13 and the service brake 14 can immediately build up in a braking force at the corresponding wheel when subsequent actuation occurs. The descriptions relating to clearance also apply in an analogous manner to the service brake 14, but owing to the high pressure buildup dynamics the overcoming of idle travel takes less time than in the case of the parking brake 13.

Figure 2:
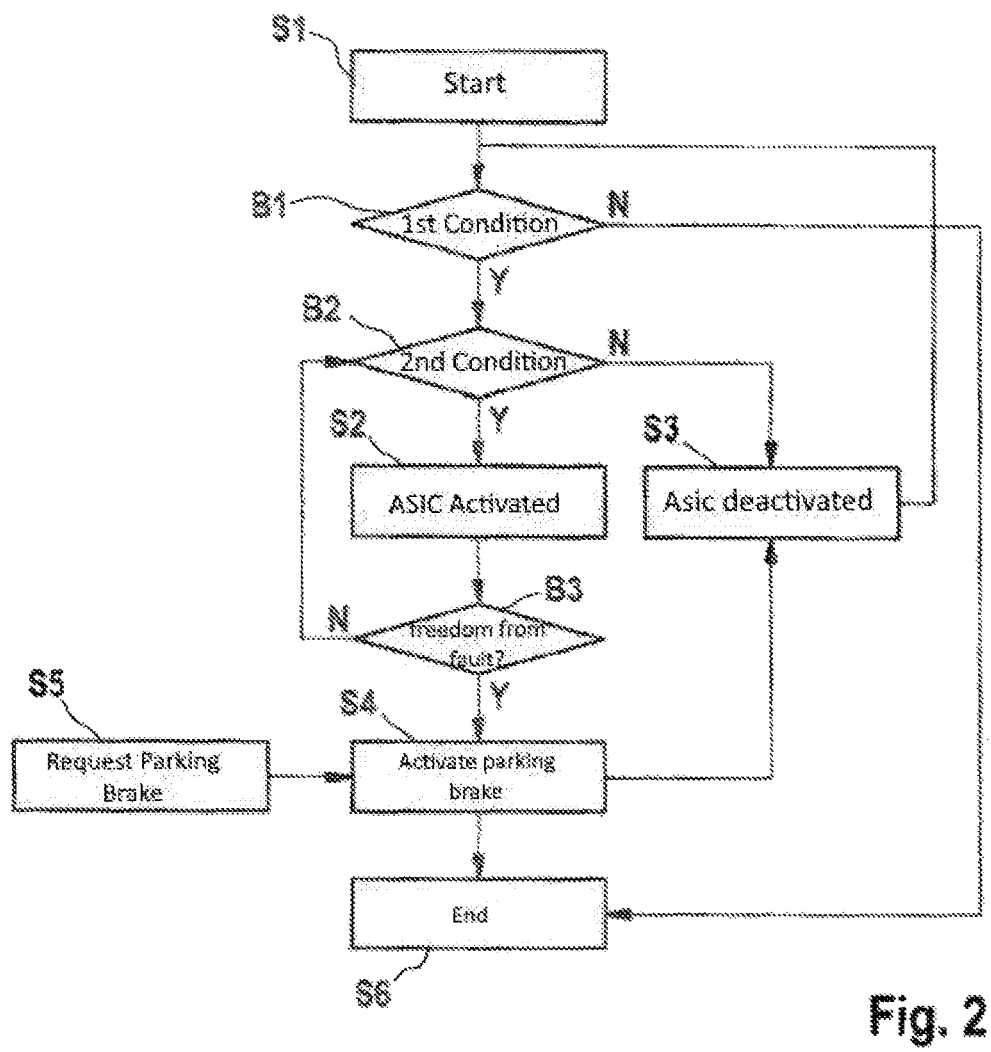
FIG. 2 shows an illustration of the method steps of an embodiment of the disclosure.

FIG. 2 shows an illustration of the method steps of an embodiment of the disclosure. In this context, in a first step S1 the method starts. The start of the method can be activated, for example, manually by the driver. An automated start of the method is also possible, for example in the case of a specific travel condition (for example a defined state of the vehicle) or a specific environmental condition (for example a defined position of the vehicle). The ASIC is inactive in the normal state, i.e. in particular at the start of the method. An inactive (or deactivated) ASIC prevents a switching signal from being passed on to the parking brake and prevents the latter from being applied thereby. In the normal state, the method starts with a released parking brake. By means of checking of a condition B0 (not illustrated) it is possible to evaluate whether the parking brake is actually completely released and open. After the start it is checked whether a first condition B1 is satisfied. In the present refinement, the condition B1 is that the system is started from the full system, i.e. that the control unit of the brake control system (for example the service brake control unit of the iBooster, ESP or IPB) is functionalized as expected and the internal monitoring operations do not report any peculiarities. If this is not the case (B1=N) the method is already terminated at this point and ended in a step S6. However, if the full functional capability of the system is assumed (B1=Y), a second condition B2 is checked. In the present refinement, the condition B2 is checking a speed threshold. It is checked whether the speed of the vehicle is lower than, for example, 10 km/h. If this is not the case (B2=N), the ASIC is or remains deactivated in a step S3. The method is executed further, for example in that the checking of the condition B1 etc. is proceeded with. However, if the speed condition is satisfied (B2=Y), the ASIC is activated in a step S2. An activated ASIC permits a switching signal to be passed on to the parking brake and the latter is applied as a result. The satisfaction of a further condition B3 of freedom from faults is subsequently checked. This can involve the same test as in B1. A varying test can also be defined. The ASIC monitors the microcontroller (□C) and/or the bus connection (SPI), here for example continuously. The checks can be carried out continuously or cyclically (for example every 10 ms). If no fault is present after a certain monitoring time (B3=N), the method can also be changed back to the checking of the condition B2. However, if a fault is identified (B3=Y), the parking brake can be activated immediately in a step S4 and applied in an automated fashion. Such activation and application can also be carried out for example if in the case of an activated ASIC the parking brake is requested in a step S5. Such a request can, for example, be triggered intentionally by the driver or else in an automated fashion by the system, for example, within the scope of a highly automated parking process. After application of the parking brake the parking process is concluded, with the result that the functional expansion by the ASIC is no longer necessary and this function can be deactivated. The ASIC is therefore deactivated in step S3. Furthermore, the method is ended after the application of the parking brake in step S6.

Furthermore, the activation of the ASIC in step S2 can be made dependent on any additional condition. This condition is, for example, the position of the vehicle at a potential parking space. For this purpose GPS data of the vehicle can be compared with map data of a known or defined parking space, parking bay, piece of private ground, underground garage, multistory car park, etc. and a probability of an imminent parking process can be determined. In this context the ASIC is activated only when a defined probability of an imminent parking process is exceeded.

Figure 3:
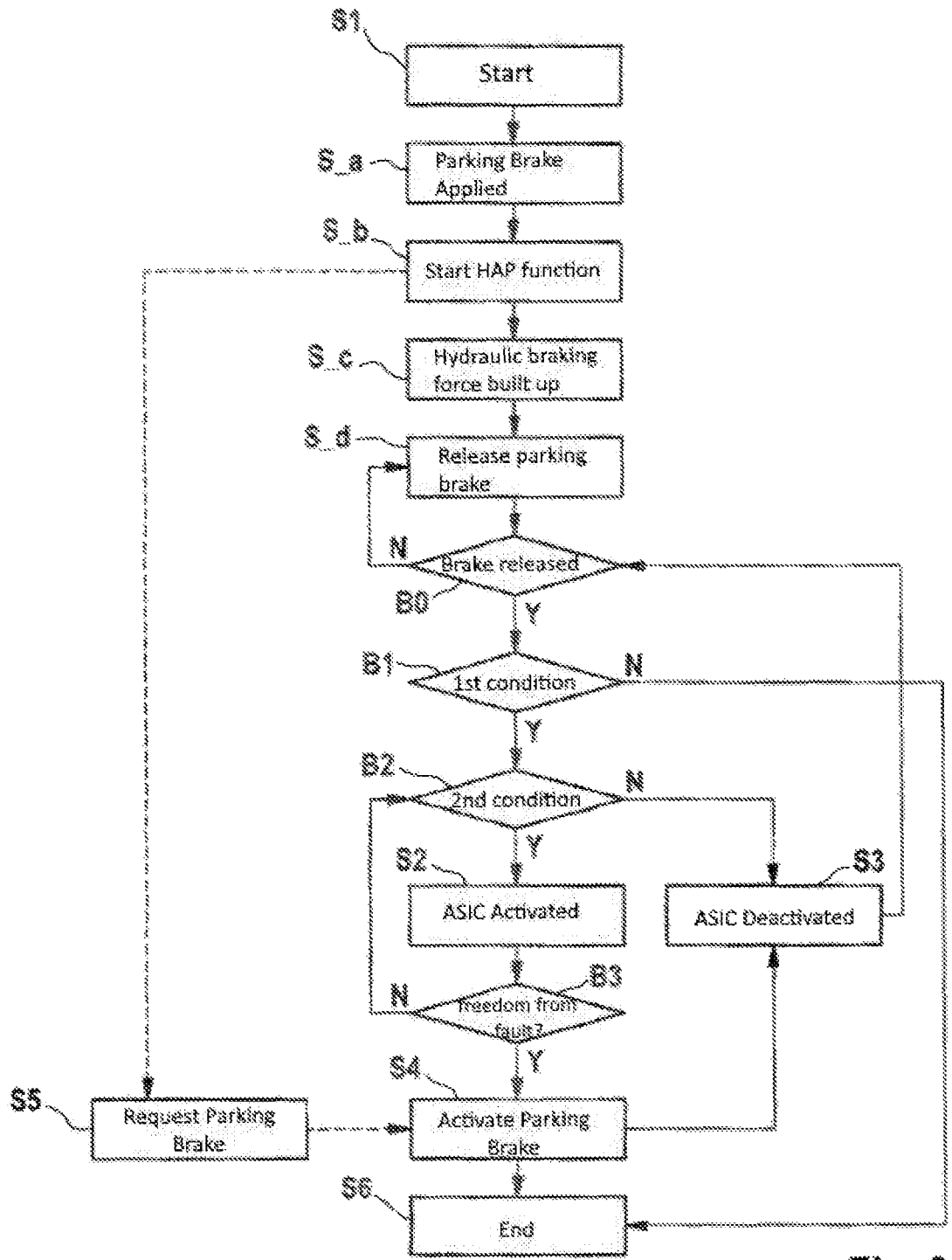
FIG. 3 shows an illustration of the method steps of a further embodiment of the disclosure in the case of a highly automated parking process.

FIG. 3 shows an illustration of the method steps of a further embodiment of the disclosure in the case of a highly automated parking process. A highly automated parking process is characterized, for example, in that the driver can exit the vehicle before the actual parking process. During the parking process the driver therefore does not have to supervise or to control said parking process. For the description of steps S1-S6 and the conditions B1-B3 reference is made to the statements relating to FIG. 2. FIG. 3 differs from FIG. 2 in the following aspects. The method starts in step S1 if a parking process is detected. The driver shuts down the vehicle for this purpose, for example next to or near to the actual parking area. In this context, in a step S_a the parking brake is applied in order to secure the stationary vehicle. The driver, for example, exits the vehicle and starts the HAP (Highly Automated Parking) function in a step S_b. The vehicle must initially be secured hydraulically in order to be able to start the parking process reliably. For this purpose, in a step S_c a hydraulic braking force is built up. Only when the vehicle is hydraulically secured is the parking brake released in an automated fashion in a step S_d. Subsequently, the condition B0 is checked to determine whether the parking brake is completely released. If this is not the case (B0=N), the parking brake is released further. If the parking brake is sufficiently opened (B0=Y), the checking of the condition B, as described above, can be proceeded with. In order to request the application of the parking brake in S5 after the execution of the highly automated parking process, a control unit can transmit a corresponding request to the parking brake as a so-called "External Park Request". The corresponding lines are shown by dashes, in order to make the dependence of the request on the execution of the parking process clear. If at any point a fault should occur, for example in the control unit, during the highly automated parking process, the parking brake is also automatically locked in this case. This means that although the driver is not located in the vehicle, a safe state of the vehicle can be brought about.

Figure 4:
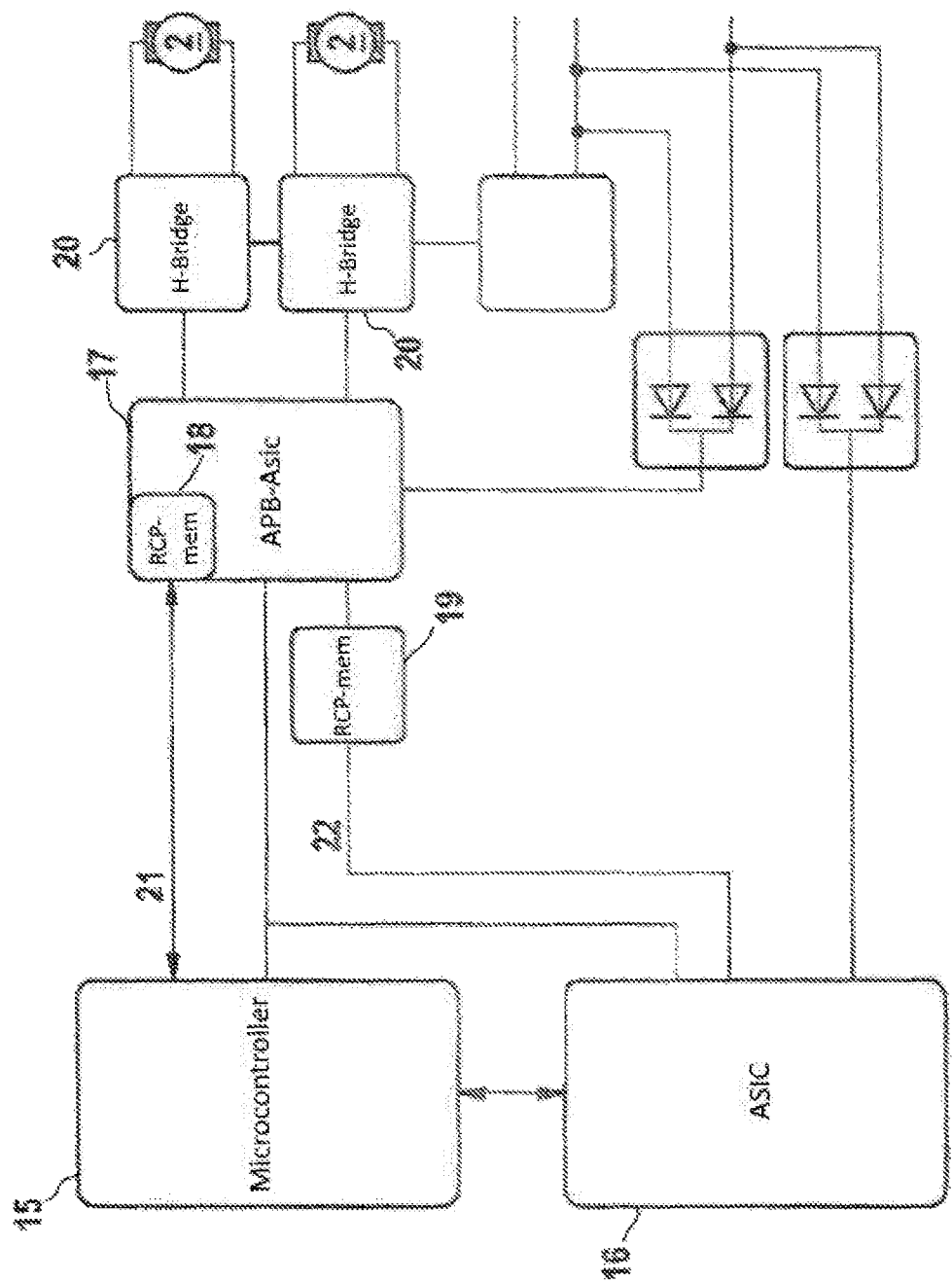
FIG. 4 shows a schematic illustration of a possible wiring arrangement for activation of an ASIC.

FIG. 4 shows a schematic illustration of a wiring arrangement for activation of an ASIC according to an embodiment of the disclosure. The terms ASIC and APB-ASIC are intended to be used analogously within the scope of this description. The actuation of the actuators 2 of the parking brake takes place by means of so-called H bridges 20. The ABC-ASIC 17 provides the possibility of actuating the H bridges 20. For this to be possible, however, the APB-ASIC 17 must be enabled by the microcontroller 15 and the system ASIC 16. For this purpose, the APB-ASIC 17 communicates continuously with the microcontroller 15 by means of the SPI connection 21. Via this SPI connection 21, the APB-ASIC 17 receives corresponding requests to lock and/or release the parking brake. However, this sequence is possible only when the entire system is in good order. Furthermore, the APB-ASIC 17 must be placed in a corresponding active mode (parking mode) in order to pass on actuation of the parking brake correspondingly to the H bridges 20. In order to place the APB-ASIC 17 in the corresponding active mode, this is communicated to the APB-ASIC 17 via the microcontroller 15. An RCP-mem 18 is provided with a corresponding entry in this context. The same is carried out by means of the APB enable line 22 or an RCP-mem 19. Having been prepared in this way and placed in the active mode, the APB-ASIC 17 monitors the function of the microcontroller 15. That is to say if a fault occurs at the microcontroller or on the bus connection APB enable line 22 or SPI 21, this is detected by the APB-ASIC 17, and the latter immediately activates the locking of the parking brake actuators.

What is claimed is:

1. A method for operating a brake system with an automated parking brake for a motor vehicle, comprising:
   detecting a defined fault; and
   activating a parking mode of the automated parking brake automatically when the defined fault is detected,
   wherein the automated parking brake is operable in different operating modes, a first operating mode corresponding to a drive mode and a second operating mode corresponding to the parking mode.

2. The method according to claim 1, further comprising:
   detecting a parking situation; and
   activating the parking mode when the parking situation is detected.

3. The method according to claim 2, further comprising:
   detecting the parking situation when a defined speed criterion is satisfied.

4. The method according to claim 3, further comprising:
   deactivating the parking mode when the defined speed criterion is no longer satisfied.

5. The method according to claim 4, further comprising:
   deactivating the parking mode when a speed of the motor vehicle is higher than a defined speed threshold.

6. The method according to claim 3, further comprising:
   detecting the parking situation when a speed of the motor vehicle is lower than a defined speed threshold.

7. The method according to claim 2, further comprising:
   detecting the parking situation based on a position of the motor vehicle.

8. The method according to claim 7, further comprising:
   detecting the parking situation based on a comparison of a GPS data of the motor vehicle and a map data.

9. The method according to claim 8, further comprising:
   detecting the parking situation based on a comparison of the GPS data of the motor vehicle and the map data for a car park and/or for a piece of private land and/or for a multistory car park and/or an underground car park.

10. The method according to claim 1, further comprising:
    detecting an automated parking process;
    activating the parking mode when the automated parking process is detected.

11. The method according to claim 1, further comprising:
    not activating the drive mode of the parking brake automatically when the defined fault is detected.

12. The method according to claim 1, further comprising:
    operating the parking brake in the different operating modes using an electronic circuit.

13. The method according to claim 12, further comprising:
    switching off the electronic circuit such that in the parking mode a switching signal input for actuating the parking brake is released and/or in the drive mode actuation of the parking brake is prevented.

14. An electronic circuit device configured to operate an automated parking brake in different operating modes, a first operating mode corresponding to a drive mode and a second operating mode corresponding to a parking mode, the electronic circuit device comprising:
    a microcontroller configured to implement a method including:
       permitting actuation of the parking brake to be released in the parking mode when the method is first started;

permitting the actuation of the parking brake to be prevented in the drive mode; and bringing about automated application of the parking brake when a defined fault is detected in the parking mode.

* * * * *